(12) United States Patent
Goyal et al.

(10) Patent No.: US 12,139,172 B2
(45) Date of Patent: Nov. 12, 2024

(54) PREDICTING NEAR-CURB DRIVING BEHAVIOR ON AUTONOMOUS VEHICLES

(71) Applicant: Waymo LLC, Mountain View, CA (US)

(72) Inventors: Vishu Goyal, Mountain View, CA (US); Kai Ding, Santa Clara, CA (US); Yang Wang, Foster City, CA (US)

(73) Assignee: Waymo LLC, Mountain View, CA (US)

( * ) Notice: Subject to any disclaimer, the term of this patent is extended or adjusted under 35 U.S.C. 154(b) by 397 days.

(21) Appl. No.: 17/316,625

(22) Filed: May 10, 2021

(65) Prior Publication Data

US 2022/0355824 A1    Nov. 10, 2022

(51) Int. Cl.
| | |
|---|---|
| *B60W 60/00* | (2020.01) |
| *G05D 1/00* | (2024.01) |
| *G06N 5/02* | (2023.01) |
| *G06N 20/00* | (2019.01) |

(52) U.S. Cl.
CPC ....... *B60W 60/0027* (2020.02); *G05D 1/0214* (2013.01); *G05D 1/0221* (2013.01); *G05D 1/0231* (2013.01); *G06N 5/02* (2013.01); *G06N 20/00* (2019.01); *B60W 2420/403* (2013.01); *B60W 2552/10* (2020.02); *B60W 2554/4026* (2020.02); *B60W 2554/4029* (2020.02); *B60W 2554/4041* (2020.02); *B60W 2554/4044* (2020.02)

(58) Field of Classification Search
CPC ......... B60W 60/0027; B60W 2420/42; B60W 2552/10; B60W 2554/4026; B60W 2554/4029; B60W 2554/4041; B60W 2554/4044; B60W 2552/53; B60W 2554/801; G05D 1/0214; G05D 1/0221; G05D 1/0231; G05D 2201/0213; G05D 1/0217; G06N 5/02; G06N 20/00; G06N 5/01; G06N 20/20; G06N 3/0464
See application file for complete search history.

(56) References Cited

U.S. PATENT DOCUMENTS

| | | | |
|---|---|---|---|
| 10,671,076 B1 * | 6/2020 | Kobilarov | G08G 1/166 |
| 10,994,727 B1 * | 5/2021 | Kumar | G06Q 30/0213 |
| 11,195,418 B1 * | 12/2021 | Hong | G08G 1/166 |
| 11,360,480 B2 * | 6/2022 | Beller | B60W 60/0017 |
| 2020/0377080 A1 * | 12/2020 | Kindo | B60W 60/0053 |
| 2021/0114514 A1 * | 4/2021 | Karol | G06N 5/04 |

* cited by examiner

*Primary Examiner* — Anne Marie Antonucci
*Assistant Examiner* — Misa H Nguyen
(74) *Attorney, Agent, or Firm* — Fish & Richardson P.C.

(57) ABSTRACT

Methods, systems, and apparatus, including computer programs encoded on computer storage media, for predicting near-curb driving behavior. One of the methods includes obtaining agent trajectory data for an agent in an environment, the agent trajectory data comprising a current location and current values for a predetermined set of motion parameters of the agent; processing a model input generated from the agent trajectory data using a trained machine learning model to generate a model output comprising a prediction of whether the agent will exhibit near-curb driving behavior within a predetermined timeframe, wherein an agent exhibits near-curb driving behavior when the agent operates within a particular distance of an edge of a road in the environment; and using the prediction to generate a planned path for a vehicle in the environment.

21 Claims, 7 Drawing Sheets

PREDICTING NEAR-CURB DRIVING BEHAVIOR ON AUTONOMOUS VEHICLES

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

SUMMARY

This specification describes how a vehicle, e.g., an autonomous or semi-autonomous vehicle, can generate a prediction of whether an agent will exhibit near-curb driving behavior. In this specification, an agent operating on a road in an environment exhibits "near-curb driving behavior" when the agent operates within a particular distance of an edge of the road. Note that the road in the environment does not necessarily have to include a physical curb; an agent can still exhibit "near-curb driving behavior" when operating near an edge of the road that does not have a curb. In this specification, the "edge" of a road is the one-dimensional boundary delineating either side of the road.

A system can predict near-curb driving behavior for any appropriate type of agent, e.g., vehicles, cyclists, or pedestrians. That is, a pedestrian who is walking near the edge of a road can exhibit "near-curb driving behavior," even though the pedestrian is on foot.

The particular distance can be defined in any appropriate way. For example, the particular distance can be the same for any road in the environment, e.g., 0.1, 0.5, 1, or 2 meters. As another example, the particular distance can be defined with respect to the width of the road. As a particular example, the particular distance can be half of the width of the road; that is, an agent exhibits near-curb driving behavior when the agent is closer to the edge of the road than to the center of the road.

In some implementations, the distance between an agent and the edge of a road is defined to be the distance between i) the point on the agent that is closest to the edge and ii) the edge. In some other implementations, the distance between an agent and the edge of a road is defined to be the distance between i) a center point of the agent and ii) the edge. Generally, the distance between an agent and the edge of a road can be defined in any appropriate way.

In some implementations, an agent is considered to operate within the particular distance of the edge of the road when the agent remains within the particular distance of the edge of the road for the entirety of a predetermined time frame, e.g., 1, 3, 5, or 10 seconds into the future. In some other implementations, if an agent is within the particular distance of the edge of the road at any time point during the predetermined time frame, then the agent is considered to exhibit near-curb driving behavior, even if at other time points during the predetermined time frame the agent is not within the particular distance of the edge of the road.

In some implementations, an agent can exhibit near-curb driving behavior with respect to the edge of a road even if the agent is not operating on the road, i.e., if the agent is operating off the road (e.g., on a sidewalk or median beside the road) but still within the particular distance of the edge of the road.

This specification also describes how a computer system can train a machine learning model to predict near-curb driving behavior using training examples generated by vehicles operating in the real world. Once the machine learning model has been trained, the trained model can be deployed on a vehicle and can be used by the vehicle to make autonomous or semi-autonomous driving decisions.

Particular embodiments of the subject matter described in this specification can be implemented so as to realize one or more of the following advantages.

Using techniques described in this specification, a system on-board a vehicle can predict the behavior of agents in the environment of the vehicle, and use the prediction to navigate within the environment. For example, some agents may consistently operate on the side of the road (e.g., delivery vehicles, mail trucks, garbage trucks, etc.), and a vehicle may wish to pass such vehicles to arrive at its destination more quickly. Thus, if the system predicts that an agent will exhibit near-curb driving behavior over a predetermined time frame, then a path-planning system of the vehicle can generate a planned path that navigates around the agent during the predetermined time frame.

Some existing systems predicted near-curb driving behavior using hand-made heuristics, e.g., according to the current velocity of an agent, its current distance from the road edge, etc. Such simple systems, however, can have limited accuracy and can be brittle to edge cases that fall outside what the designers had in mind when defining the heuristics. This specification described machine learning models that can be trained to predict near-curb driving behavior with much higher accuracy, and can be trained using a large corpus of training data so that the model can be prepared for a wide variety of different situations. For example, in some embodiments described in this specification, the machine learning model is trained directly on training examples generated by vehicles operating in the real world. Particularly, these training examples were gathered over many driving hours and by many different autonomous vehicles. This direct training can yield more accurate predictions than existing techniques.

In some embodiments described in this specification, a system can generate respective near-curb predictions for each of multiple agents at each of multiple future time points in a single forward pass. This is an improvement on existing techniques, some of which can only generate a prediction for a single agent at a single time point.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model to predict whether one or more agents will exhibit near-curb driving behavior. In this specification, an "agent" can refer, without loss of generality, to a vehicle, bicycle, pedestrian, ship, drone, or any other moving object.

Figure 1:
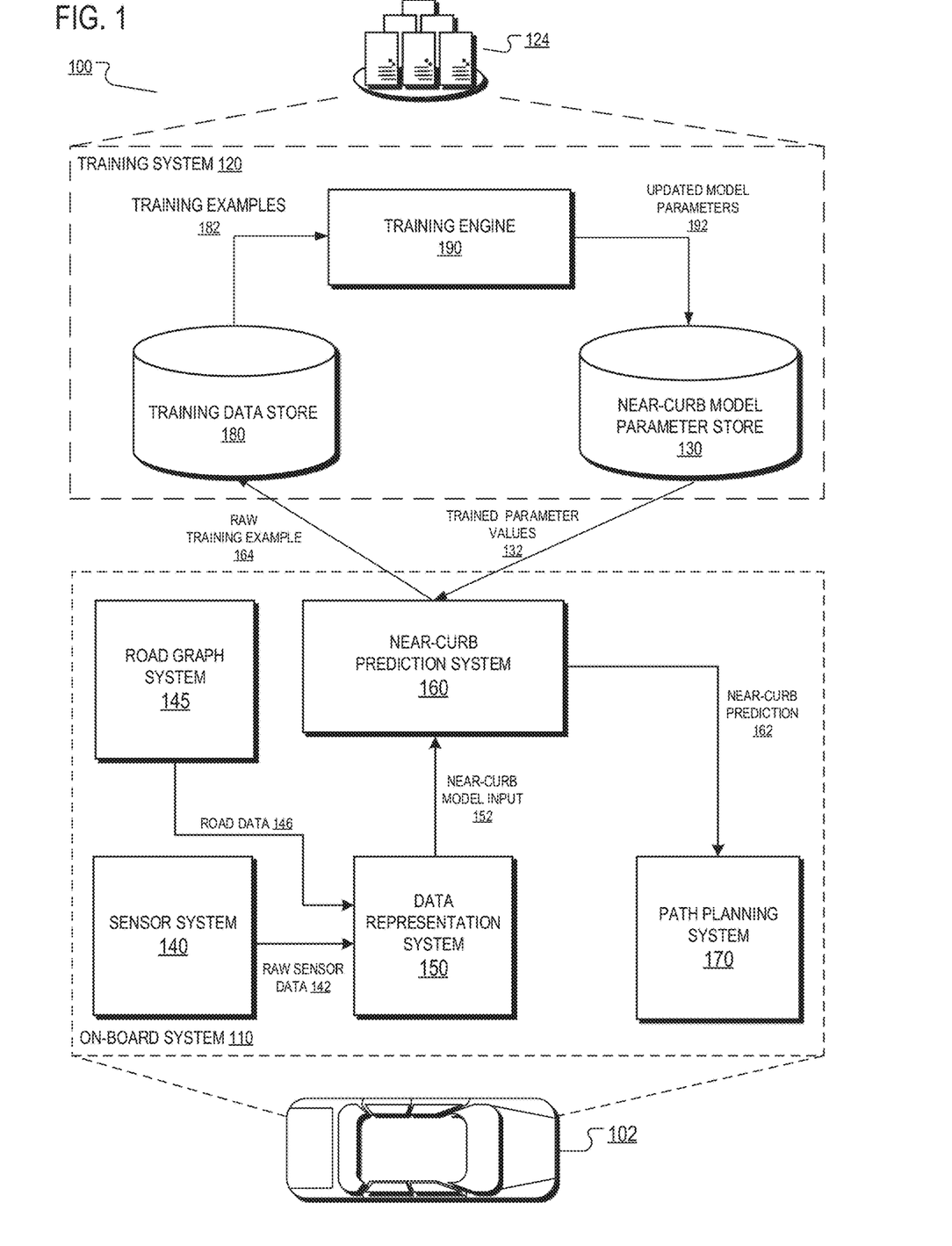
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes a sensor system 140, a data representation system 150, a near-curb prediction system 160, and a path planning system 170.

The sensor system 140 can include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor system 140 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor system 140 classifies one or more groups of raw sensor measurements as being measures of respective other agents in the environment, the sensor system 140 can compile the raw sensor measurements into a set of raw data 142, and send the raw data 142 to a data representation system 150.

The data representation system 150, also on-board the vehicle 102, receives the raw sensor data 142 from the sensor system 140 and processes the raw sensor data 142 to put it into a form that can be received by the near-curb prediction system 160, generating a near-curb model input 152. The near-curb model input 152 characterizes, for each of one or more agents in the environment, a current state of the agent at the current time point and, optionally, a previous state of the agent at one or more respective previous time points. The state of an agent at a given time point can include the location of the agent at the given time point, as well as values for a predetermined set of motion parameters. The motion parameters can include one or more of: a heading for the agent, a velocity of the agent, or an acceleration of the agent.

In some implementations, the data representations system 150 also obtains road data 146 from a road graph system 145. The road data 146 can be any data that represents roads in the environment. For example, the road data 146 can include a map of the environment that includes each known road in the environment, and optionally other known features of the environment. As a particular example, the road data 146 can include a top-down image of the environment that depicts the features of the roads in the environment, such as the lanes of the road, cross walks, traffic lights, stop signs, and so on.

The data representation system 150 can use the road data 146 in addition to the raw sensor data 142 to generate the near-curb model input 152. That is, the near-curb model input 152 can also characterize the roads in the environment, helping the near-curb prediction system 160 predict whether an agent in the environment will operate near the edge of one of the roads.

In some implementations, the data representation system 150 generates a respective different near-curb model input 152 for each agent in the environment. In some other implementations, the data representation system 150 generates a single near-curb model input 152 for each agent of a particular type in the environment, e.g., a set for all vehicles in the environment, a different set for all cyclists in the environment, a different set for all pedestrians in the environment, and so on. In some other implementations, a single near-curb model input 152 can characterize multiple different types of agent. As a particular example, the data representation system 150 can generate a first near-curb model input 152 for vehicles and cyclists in the environment, and a second near-curb model input 152 for pedestrians in the environment. As another particular example, the data representation system 150 can generate a single near-curb model input 152 for all agents of all types in the environment.

The near-curb model input 152 can have any appropriate format. For example, the near-curb model input 152 for a particular agent in the environment can include a vector that includes elements identifying the location of the particular agent and values for the predetermined set of motion parameters. As another example, the near-curb model input 152 can include a top-down image of the environment that includes a rendering of each agent represented by the near-curb model input 152. An example model input is described in more detail below in reference to FIG. 4.

The data representation system 150 can provide the near-curb model input 152 to the near-curb prediction system 160, also on-board the vehicle 102. The near-curb prediction system 160 processes the near-curb model input 152 using one or more machine learning models to generate a near-curb prediction 162 that predicts whether one or more of the agents represented by the near-curb model input 152 will exhibit near-curb driving behavior within a predetermined time frame in the future.

In some implementations, the predetermined time frame begins at the current time point; e.g., the predetermined time frame can extend from the current time point to 1, 3, 5, or 10 seconds in the future. In some other implementations, the beginning of the predetermined time frame is also in the future; e.g., the predetermined time frame can be between 5 and 10 seconds in the future.

The near-curb prediction 162 can include, for each agent represented by the near-curb model input 152, a respective score characterizing a likelihood that the agent will exhibit near-curb driving behavior in the predetermined time frame. Instead or in addition, the near-curb prediction 162 can include, for each agent represented by the near-curb model input 152, a predicted distance from the curb that the agent will maintain during the predetermined time frame. In some implementations, the predicted distance represents the average distance that the agent will maintain; in some other implementations, the predicted distance represents the maximum or minimum distance that the agent will maintain. In some implementations, the near-curb prediction 162 can characterize a range of possible distances from the curb maintained by the agent, e.g., a predicted range of distances that the agent will maintain, or a predicted distance and a standard deviation of the predicted distance.

In implementations in which the near-curb model input 152 represents multiple different agents in the environment, the near-curb prediction system 160 can generate a respective near-curb prediction 162 for each represented agent. For example, the near-curb prediction system 162 can generate a vector of scalar values, where each element corresponds to a respective different represented agent and represents the likelihood that the agent will exhibit near-curb driving behavior. As another example, the near-curb prediction 162 can include a single top-down image of the environment that includes, for each represented agent in the environment, a respective prediction. An example top-down image of a near-curb prediction 162 is described in more detail below with reference to FIG. 3.

In some other implementations in which the near-curb model input 152 represents multiple different agents in the environment, the near-curb prediction system 160 can generate a respective different near-curb prediction 162 for each type of agent in the environment. That is, the near-curb prediction 162 corresponding to a particular type of agent characterizes a respective prediction for each agent that i) is represented by the near-curb model input 152 and ii) is the particular type.

In some implementations, the near-curb prediction system 160 can generate a respective near-curb prediction 162 for each of multiple different time frames. That is, the near-curb prediction system 160 can predict whether the agent represented by the near-curb model input 152 will exhibit near-curb driving behavior during any or all of the multiple different time frames.

In some implementations, the near-curb prediction system 160 can include a first machine learning model that generates a predicted likelihood that an agent will exhibit near-curb driving behavior, and a second machine learning model that generates a predicted distance from the edge of the road that the agent will maintain. In some such implementations, the data representation system 150 can generate a different near-curb model input 152 for both machine learning models. An example near-curb prediction system is described in more detail below with reference to FIG. 2.

In some implementations, for a particular agent, the near-curb prediction 162 identifies a particular road edge in the environment near which the particular agent is predicted to operate. In some other implementations, the near-curb prediction 162 does not identify any specific road edge, and the near-curb prediction system 160 can determine the closest road edge to the particular agent, and predict the determined closest road edge to be the road edge near which the particular agent will operate. Example techniques for conditioning a near-curb prediction system 160 on a particular road edge are described in more detail below with reference to FIG. 2.

The on-board system 100 can provide the near-curb prediction 162 generated by the near-curb prediction system 160 to the path planning system 170. The path planning system 170 is configured to generate a planned path for the vehicle 102 that characterizes a path that the vehicle 102 will take in the future.

When the path planning system 170 receives the near-curb prediction 162, the path planning system 170 can use the near-curb prediction 162 to generate a new planned path for the vehicle 102. For example, the near-curb prediction 162 may contain a prediction that a particular agent in front of the vehicle 102 is likely to exhibit near-curb driving behavior. In this example, the path planning system 170 can generate a new planned path for the vehicle 102 that goes around the particular agent. That is, the path planning system 170 can modify the planned future trajectory of the vehicle 102, e.g., to increase efficiency of the route by passing a vehicle that is driving close to the edge of the road. After the path planning system 170 generates or updates the planned path, a navigation system of the vehicle 102 can execute the planned path and cause the vehicle 102 to navigate along the planned path.

In some implementations, instead of or in addition to providing the near-curb prediction 162 to the path planning system 170, the on-board system 110 can provide the near-curb prediction 162 to a user interface system on-board the vehicle 102. When the user interface system receives the near-curb prediction 162, the user interface system can use the near-curb prediction 162 to present information to a driver of the vehicle 102 to assist the driver in operating the vehicle 102 safely (e.g., in implementations in which the vehicle 102 is semi-autonomous). The user interface system can present information to the driver of the vehicle 102 by any appropriate means, for example, by an audio message transmitted through a speaker system of the vehicle 102 or by alerts displayed on a visual display system in the vehicle 102 (e.g., an LCD display on the dashboard of the vehicle 102). In a particular example, the near-curb prediction 162 may contain a prediction that a particular agent in the environment is likely to exhibit near-curb driving behavior. In this example, the user interface system can present an alert message to the driver of the vehicle 102 with a recommendation to pass the particular agent.

In some implementations, instead or in addition to providing the near-curb prediction 162 to the path planning system 170 or a user interface system, the on-board system 110 can provide the near-curb prediction 162 to one or more other systems on-board the vehicle 102 for storage or further processing, e.g., as input to one or more additional machine learning models.

The near-curb prediction system 160 can generate a new near-curb prediction 162 at regular intervals during the operation of the vehicle 102, e.g., every 1, 10, 100, or 1000 milliseconds.

To generate the near-curb prediction 162, the near-curb prediction system 160 can use trained parameter values 132 that it obtains from a near-curb model parameter store 130 in the training system 120.

The training system 120 is typically hosted within a data center 124, which can be a distributed computing system having hundreds or thousands of computers in one or more locations.

The training system 120 includes a training data store 180 that stores all the training data used to train the parameter values of the near-curb prediction system 160. The training data store 180 receives raw training examples from vehicles operating in the real world. For example, the training data store 180 can receive a raw training example 164 from the vehicle 102 and one or more other vehicle that are in communication with the training system 120.

The raw training example 164 can be processed by the training system 120 to generate a new training example. The raw training example 164 includes the near-curb model input 152 that can be used as a training input for the machine learning model of the near-curb prediction system 160. The raw training example 164 also includes outcome data characterizing whether the one or more agents represented by the near-curb model input 152 actually exhibited near-curb driving behavior within the predetermined time frame for which the near-curb prediction 162 was generated. This outcome data can be used to generate a ground-truth output for the new training example. The process for generating a new training example from raw data is described in more detail below in reference to FIG. 7.

The training data store 180 provides training examples 182 to a training engine 190, also housed in the training system 120. The training engine uses the training examples 182 to update the model parameters of the machine learning models that will be used by the near-curb prediction system 160, and provides the updated model parameters 192 to the near-curb model parameter store 130. Once the parameter values of the near-curb prediction system 160 have been fully trained, the training system 120 can send the trained parameter values 132 to the near-curb prediction system 160 on-board the vehicle 102, e.g., through a wired or wireless connection.

Figure 2:
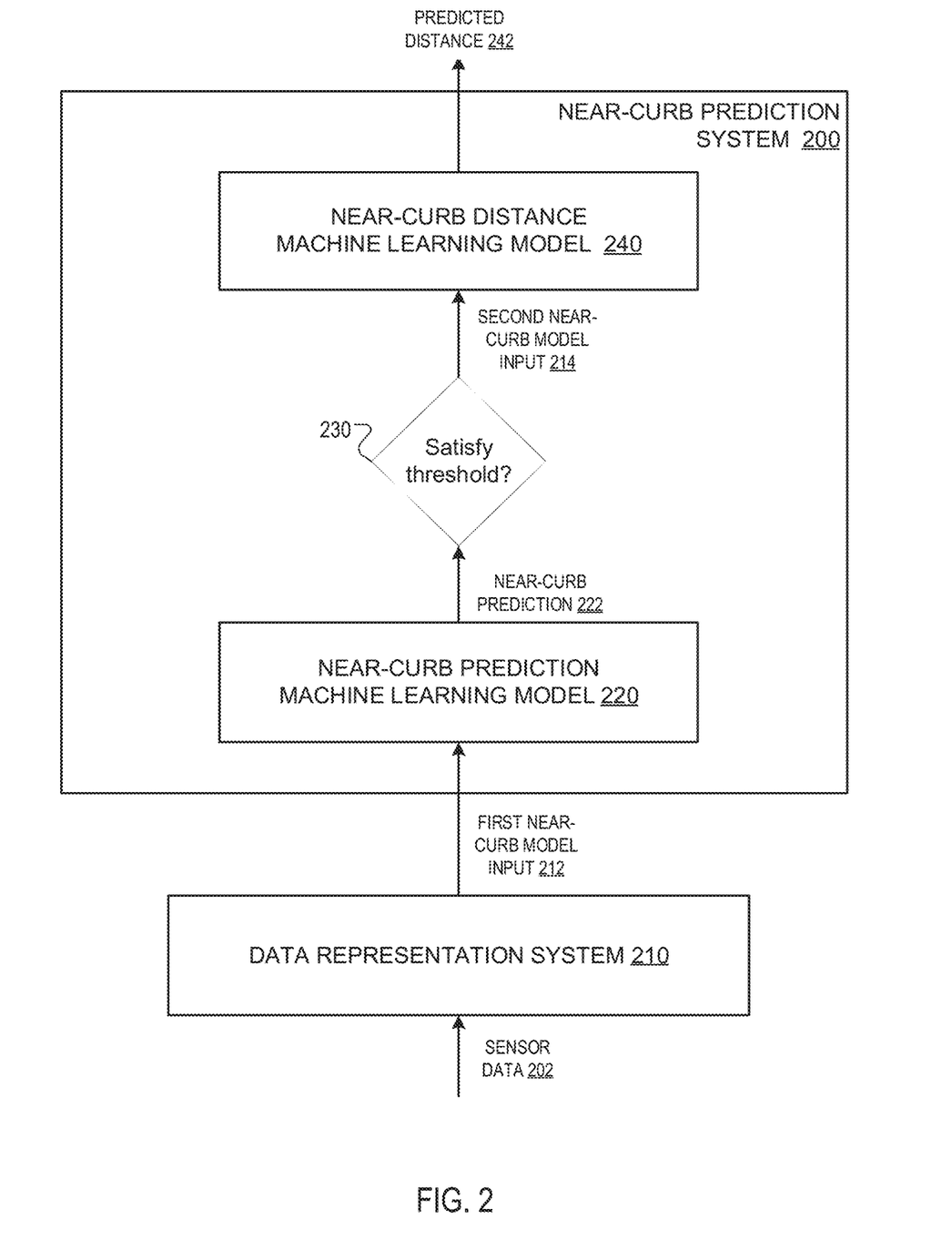
FIG. 2 is a block diagram of an example near-curb prediction system.

FIG. 2 is a block diagram of an example near-curb prediction system 200. The near-curb prediction system 200 is an example of a system implemented as computer programs on one or more computers in one or more locations in which the systems, components, and techniques described below are implemented.

The near-curb prediction system 200 is configured to predict whether one or more agents in an environment will exhibit near-curb driving behavior. The near-curb prediction system 200 includes a near-curb prediction machine learning model 220 and a near-curb distance machine learning model 240.

A data representation system 210 can process sensor data 202 characterizing one or more agents in an environment to generate a first near-curb model input 212. For example, the data representation system 210 can be configured similarly to the data representation system 150 described above. As a particular example, the first near-curb model input 212 can have the channel format described below with reference to FIG. 4 and FIG. 5. Although the data representation system 210 is depicted as external to the near-curb prediction system 200 in FIG. 2, in some implementations the data representation system 210 can be a component of the near-curb prediction system 200.

The data representation system 210 can provide the first near-curb model input 212 to the near-curb prediction machine learning model 220. The near-curb prediction machine learning model 220 is a trained machine learning model that is configured to process the first near-curb model input 212 and to generate a near-curb prediction 222 that characterizes, for each agent represented by the first near-curb model input 212, a likelihood that the agent will exhibit near-curb driving behavior in a predetermined time frame. For example, if the first near-curb model input 212 represents a single agent, then the near-curb prediction 222 can be a scalar value between 0 and 1 representing the predicted likelihood (e.g., a value of 0.9 would represent a 90% likelihood that the agent will exhibit near-curb driving behavior).

As another example, the near-curb prediction 222 can include an image, i.e., a two-dimensional array of data values, where the image represents a "top-down" perspective of the environment. Each element in the image corresponds to a respective location in the environment, and the value at each element corresponds to a predicted near-curb likelihood of the respective location. The near-curb likelihood for a location occupied by an agent in the current time point characterizes the likelihood that the agent will exhibit near-curb driving behavior. The near-curb likelihood for a location not currently occupied by an agent can have no meaning; during training, the near-curb prediction machine learning model 220 can learn to generate a null or zero near-curb likelihood for such locations. That is, the image can include a non-zero value at each element representing a location currently occupied by an agent, and a zero or null value at all other locations. An example two-dimensional image of a near-curb prediction 222 is described in more detail below with reference to FIG. 3.

The near-curb prediction machine learning model 220 can include a decision tree, e.g., a gradient-boosted decision tree (GBDT). The near-curb prediction machine learning model 220 can process the first near-curb model input 212 using an embedding layer to generate an input to the GBDT. For example, the embedding layer can be a linear or nonlinear neural network layer. In some implementations, e.g., in implementations in which the first near-curb model input 212 represents a single agent, the GBDT can output either a scalar value representing the likelihood that the agent will exhibit near-curb driving behavior (e.g., if the decision tree is a regression tree) or a binary value representing whether or not the agent will exhibit near-curb driving behavior (e.g., if the decision tree is a classification tree). In implementations in which the near-curb prediction 222 is a binary value, the near-curb prediction system 200 can skip step 230 (described below).

Instead or in addition, the near-curb prediction machine learning model 220 can include a convolutional neural network. For example, in implementations in which the first near-curb model input 212 includes two-dimensional arrays (e.g., arrays described below with reference to FIGS. 4 and 5), a convolutional neural network can learn to exploit complex interactions between different spatial regions of the environment by processing the two-dimensional channels using multi-dimensional convolutional filters, thereby generating more accurate predictions.

Instead or in addition, the near-curb prediction machine learning model 220 can include a recurrent neural network. That is, at each time point that the near-curb prediction machine learning model 220 generates a near-curb prediction 222 (e.g., at regular intervals during the operation of a vehicle in the environment), the model 220 can process i) the first near-curb model input 212 and ii) a hidden state maintained by the recurrent neural network, thus allowing the model 220 to track the behaviors the agents in the environment over time.

In some implementations in which the near-curb prediction machine learning model 220 includes a neural network, the neural network can have multiple different subnetworks, called "head" subnetworks herein, corresponding to respective agent types. That is, regardless of the type of agent represented by the first near-curb model input 212, the near-curb prediction machine learning model 220 can process the input 212 using the same one or more subnetworks to generate an updated representation. The near-curb prediction machine learning model 220 can then process the updated representation using the head subnetwork corresponding to the type of agent represented by the first near-curb model input 212. For example, a training system can train the neural network with a single head subnetwork corresponding to one agent type, and then fine tune the neural networks using the other head subnetworks corresponding to respective other agent types.

The near-curb prediction system 200 can process the near-curb prediction 222 to determine, for each agent, whether the score characterizing the predicted likelihood that the agent will exhibit near-curb driving behavior satisfies a predetermined threshold, e.g., 0.5, 0.75, 0.9, or 0.95 (step 230). If none of the agents have likelihoods that satisfy the threshold, the near-curb prediction system 200 can determine to end the process.

For agents whose likelihood does satisfy the threshold, the near-curb prediction system 200 can provide a second near-curb model input 214 to the near-curb distance machine learning model 240. Similar to the first model input 212, the second near-curb model input 212 characterizes the current state of the identified agents. In some cases (e.g., when the score of each agent satisfies the threshold), the first near-curb model input 212 and the second near-curb model input 214 are the same.

In some implementations in which the second near-curb model input 214 represents a subset of the agents represented by the first near-curb model input 212, the second model input 214 can have the same format as the first model input 212. For example, if the first model input 212 includes a top-down image of the environment with renderings of each represented agent, then the second model input 212 can include a top-down image of the environment with renderings of the subset of agents.

The near-curb distance machine learning model 240 is configured to process the second near-curb model input 214 to generate, for each agent represented by the second model input 214, a predicted distance 242 of the agent from the edge of the road that the agent will maintain during the time frame. In some implementations, the predicted distance 242 represents the average distance that the agent will maintain; in some other implementations, the predicted distance 242 represents the maximum or minimum distance that the agent will maintain. For example, the near-curb distance machine learning model 240 can include a neural network, e.g., a neural network with a similar architecture to those described above with reference to the near-curb prediction machine learning model 220.

The near-curb distance machine learning model 240 can have a similar architecture to the near-curb prediction machine learning model 220 described above. For example, the near-curb distance machine learning model can include one or more of: a GDBT, a convolutional neural network, or a recurrent neural network.

In some implementations, the near-curb prediction system 200 does not execute step 230 and instead generates a near-curb predicted distance 242 characterizing each agent represented by the first near-curb model input 212.

In some implementations, the near-curb prediction machine learning model 220 and the near-curb distance machine learning model 240 can be the same machine learning model. That is, a single machine learning model can generate, for each agent represented by the near-curb model input 212, both i) a predicted likelihood that the agent will exhibit near-curb driving behavior during a particular time frame and ii) a predicted distance from the edge of the road that the agent will maintain during the particular time frame. For example, the single machine learning model can generate an image that includes a respective element for each location in the environment, as described above, where a first channel of the image characterizes the predicted likelihoods (i.e., the near-curb predictions 222) and a second channel of the image characterizes the predicted distances (i.e., the predicted distances 242).

In some implementations, one or both of the near-curb prediction machine learning model 220 or the near-curb distance machine learning model 240 are configured to process model inputs that are conditioned on a particular road edge in the environment and generate model outputs corresponding to the particular road edge.

In particular, the near-curb prediction machine learning model 220 can i) process a first near-curb model input 212 that identifies the particular road edge in the environment, and ii) generate a near-curb prediction 222 that characterizes, for each agent represented by the first near-curb model input 212, a likelihood that the agent will exhibit near-curb driving behavior with respect to the particular road edge (i.e., will operate close to the particular road edge). For example, the first near-curb model input 212 can include, or be generated from, data representing one or more of: an absolute position of the particular road edge in the environment; a relative position of the particular road edge with respect to a reference point (e.g., with respect to the current position of a vehicle operating in the environment); or a top-down image of the particular road edge in the environment.

Similarly, the near-curb distance machine learning mode 240 can i) process a second near-curb model input 214 that identifies the particular road edge in the environment, and ii) generate a predicted distance 242 that characterizes, for each agent represented by the second model input 214, a predicted distance 242 of the agent from the particular road edge that the agent will maintain during the time frame.

For example, the near-curb prediction system 200 can process a respective different first near-curb model input 212 and/or a respective different second near-curb model input 214 for each road edge in the environment (e.g., each road edge within a predetermined distance of a vehicle operating in the environment). If a particular agent is predicted to satisfy the criteria for exhibiting near-curb driving with respect to one or more road edges, then the near-curb prediction system 200 can determine the road edge corresponding to the highest predicted confidence (e.g., the largest likelihood identified by the near-curb predictions 222) and predict that the particular agent with exhibit near-curb driving behavior with respect to the determined road edge.

In implementations in which the near-curb prediction system 200 does not condition any model input on a particular road edge, if a particular agent is predicted to exhibit near-curb driving behavior (without any particular road edge specified), then the near-curb prediction system 200 can determine the road edge that is closest to the current position of the particular agent, and predict that the particular agent will exhibit near-curb driving behavior with respect to the determined closest road edge.

Figure 3:
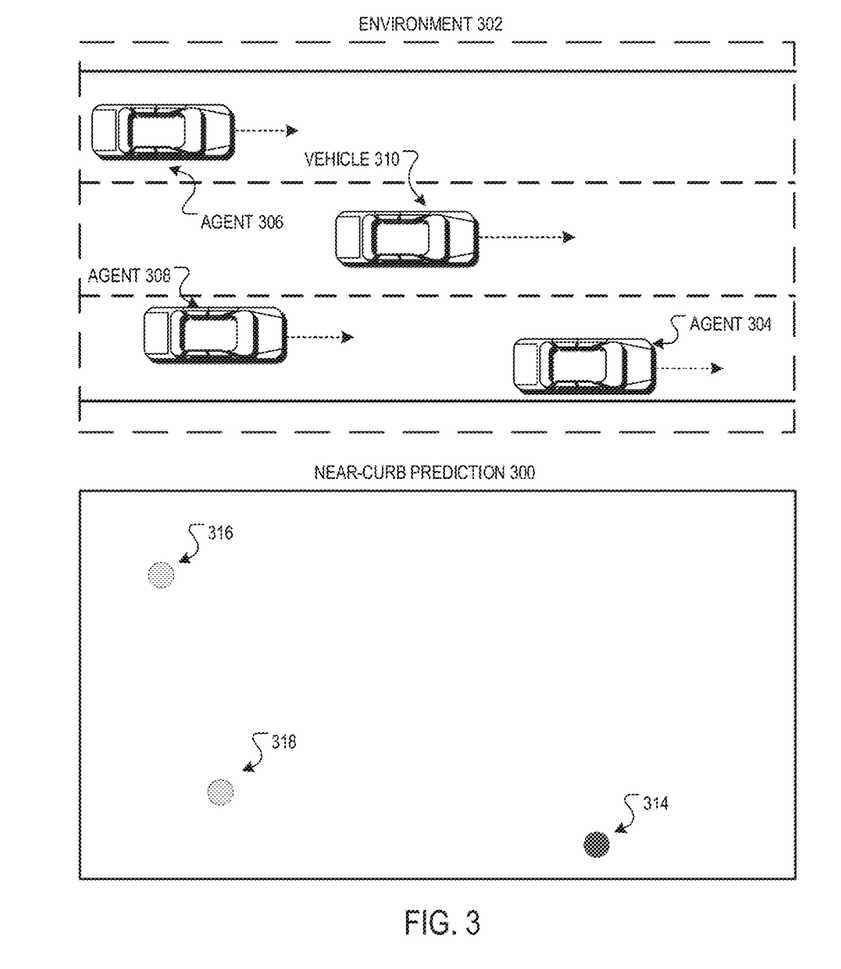
FIG. 3 is an illustration of an example near-curb prediction corresponding to an environment.

FIG. 3 is an illustration of an example near-curb prediction 300 corresponding to an environment 302.

The environment 302 contains a vehicle 310 and three agents 304, 306, and 308. The agent 304 appears likely to exhibit near-curb driving behavior, while the agents 306 and 308 appear unlikely to exhibit near-curb driving behavior.

The near-curb prediction 300 is an example two-dimensional array generated by a trained machine learning model, e.g., the near-curb prediction machine learning model 220 depicted in FIG. 2. The array represents a "top-down" perspective of the environment 302, where each position corresponds to a respective location in the environment 302. For example, a position 314 corresponds to the location occupied by the agent 304, a position 316 corresponds to the location occupied by the agent 306, and a position 318 corresponds to the location occupied by the agent 308.

In some implementations where the model input to the machine learning model is also a top-down image, e.g., the representation described below with respect to FIGS. 4 and 5, the near-curb prediction 300 can have the same dimensions as the model input, so that a position in the output array characterizes the same location in the environment as the corresponding position in the input array.

The value at each position identifies the near-curb likelihood of the respective location. In some implementations, an RGB image can be created depicting the near-curb prediction 300, where a respective block of one or more pixels corresponds to each position in the near-curb prediction, and higher near-curb likelihoods are depicted as darker grayscale values of the respective block of pixels. Such an image is useful during training of the machine learning model, e.g., to allow a user to visually inspect the progress of the training of the model.

For example, the position 314 has a dark grayscale value corresponding to a high near-curb likelihood, as the corresponding agent 304 has a high likelihood of remaining near the curb during the predetermined time frame. The positions 316 and 318 have light grayscale values corresponding to low near-curb likelihoods, as the corresponding agents 306 and 308 have low likelihoods exhibiting near-curb behavior during the predetermined time frame.

In some implementations, the positions in the near-curb prediction 300 that characterize locations in the environment not occupied by an agent can have a default value, e.g., 0, or a white or black grayscale value. During the course of training, the machine learning model learns to generate the default value for locations that are not occupied by an agent because the ground-truth outputs are formatted that way. In some other implementations, the machine learning model can be trained using a loss function that ignores the positions in the near-curb prediction 300 that characterize locations in the environment not occupied by an agent, and so the machine learning model can assign any value to these locations.

Figure 4:
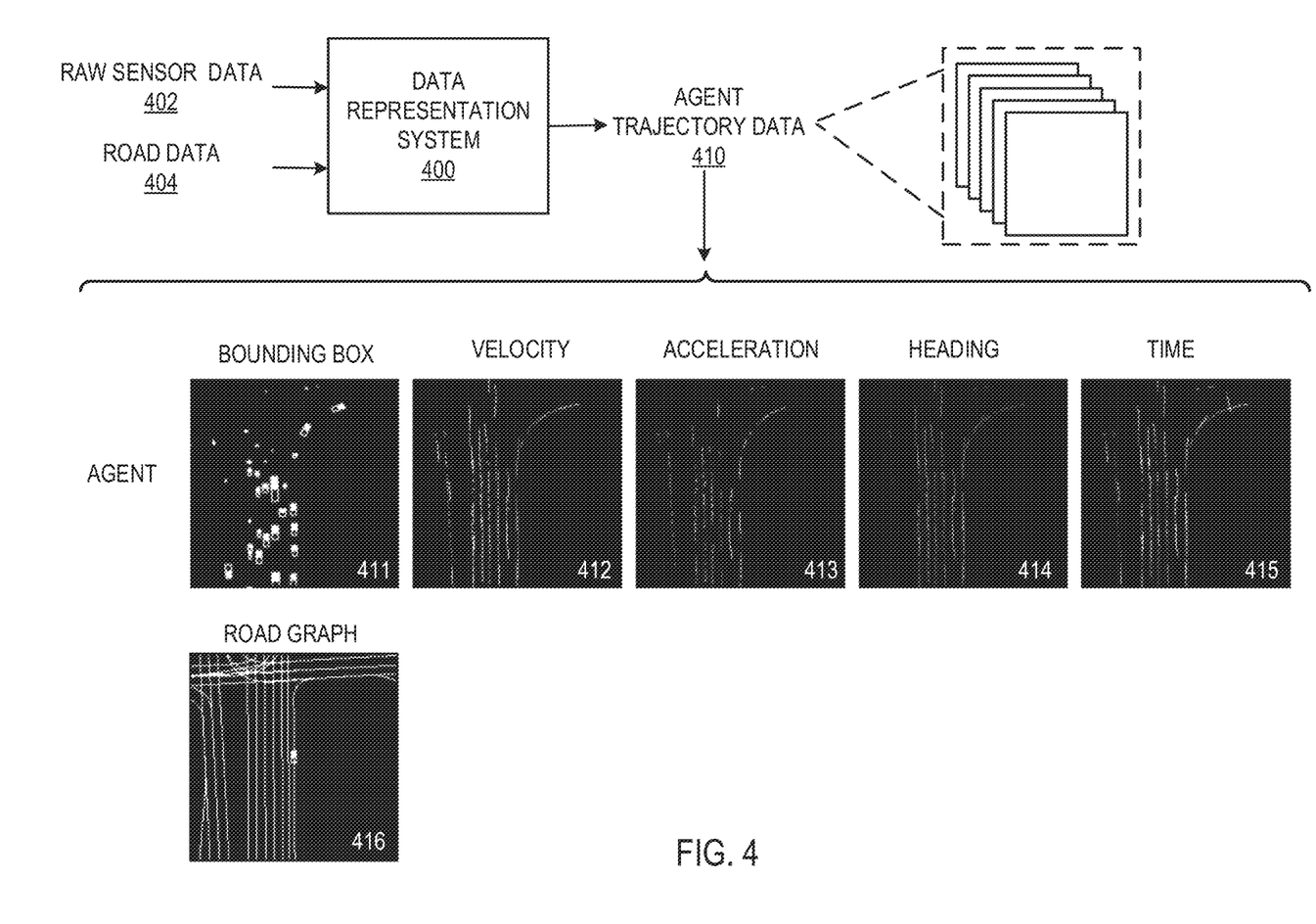
FIG. 4 is a block diagram of an example data representation system for generating agent trajectory data.
Figure 5:
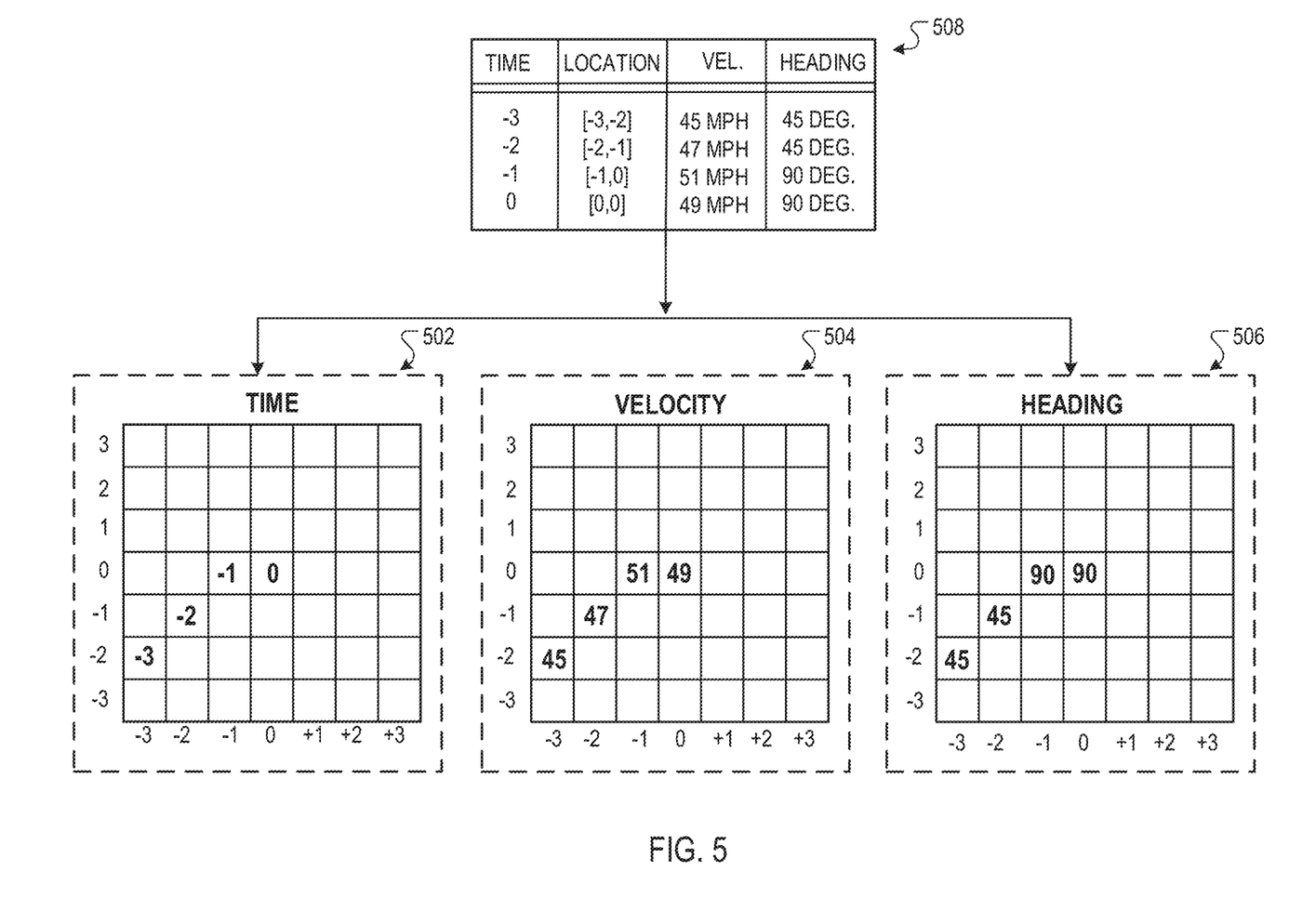
FIG. 5 is an illustration of an example process by which a data representation system can generate channels.

FIG. 4 and FIG. 5 depict an example near-curb model input that can be provided as input to a machine learning model that is configured to predict whether the agents will exhibit near-curb driving behavior, e.g., the near-curb model input 152 depicted in FIG. 1. In particular, a system can generate agent trajectory data represented by multiple two-dimensional channels; this agent trajectory data can be included in the model input, optionally with other inputs.

FIG. 4 is a block diagram of an example data representation system 400 for generating agent trajectory data 420. The data representation system 400 is an example of a system implemented as computer programs on one or more computers in one or more locations in which the systems, components, and techniques described below are implemented.

The agent trajectory data 420 characterizes the current state and one or more previous states of each agent in an environment. The data representation system 400 processes raw sensor data 402 and, optionally, road data 404 to generate the agent trajectory data 410.

The agent trajectory data 410 is composed of multiple "channels". Each channel is a two-dimensional array of data values that represents a "top-down" perspective of the environment. Each position in each channel corresponds to a respective location in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same location in the environment. In other words, corresponding positions in different channels correspond to the same location in the environment.

To represent the trajectory of each agent, the agent trajectory data 410 includes a time channel and respective motion parameter channels corresponding to each of a predetermined set of motion parameters. Each of the motion parameters characterizes a respective characteristic of the motion of the an agent, for example, the velocity, acceleration, or heading of the vehicle. As depicted in FIG. 4, the vehicle trajectory data 410 may include a time channel 415, a velocity channel 412, an acceleration channel 413, and a heading channel 414.

The time channel and the motion parameter channels represent the previous trajectory of the agents in the environment up to and including the current time point, derived from the raw sensor data 402.

The time channel represents the respective time points at which the agents occupy different locations in the environment in the trajectories of the agents. Each motion parameter channel represents the values of the respective motion parameter characterizing the motion of the agents when the agents occupy different locations in the environment in the trajectories of the agents. In particular, for each location in the environment which is occupied by an agent, the data value in the time channel which corresponds to the location defines the time point at which the agent occupies the location. Moreover, the data value in each respective motion parameter channel which corresponds to the location defines the value of the respective motion parameter characterizing the motion of the agent when the agent occupies the location in the environment.

Generally, the environment may include multiple locations which are not included in the trajectories of any of the agents. For these locations, the data representation system 400 can set the data values in the time channel and the motion parameter channels which correspond to these locations to a default value (e.g., the value 0 or the value −1).

When the same location in the environment is occupied by agents at multiple time points, then the data representation system 400 can set the respective data values in the time channel and motion parameter channels which correspond to the location to any appropriate values. For example, the data representation system 400 can set the respective data values in the time channel and motion parameter channels which correspond to the location in accordance with the last time point when one of the agents occupies the location.

In some implementations, the data representation system 400 can include further channels in the agent trajectory data 410 in addition to the time channels and motion parameter channels. For example, the agent trajectory data 410 can include a road-graph channel, a localization channel, or both. A road-graph channel represents a known geometry of the environment in the vicinity of the vehicle. For example, the road-graph channel may represent the positions of different features of the environment, including: the road, different lanes in the road, crosswalks, traffic lights, construction zones, school zones, and the like. The road graph channel can be generated from the road data 404. A localization channel represents the respective locations of the agents in the environment at the current time point (e.g., as represented by a bounding box). As depicted in FIG. 4, the vehicle trajectory data 410 may include a bounding box channel 411 and a road graph channel 416.

By jointly representing the trajectories of the agents using a single time channel and a single motion parameter channel corresponding to each motion parameter, the data representation system 400 can generate agent trajectory data 410 with a predetermined dimensionality irrespective of the (variable) number of agents. In this manner, the agent trajectory data 410 generated by the data representation system 400 can be readily processed by a machine learning model, which is configured to process model inputs of the predetermined dimensionality.

By representing the respective trajectories of the agents in this format, the data representation system 400 can generate a representation which is both compact and can be effectively processed by a machine learning model. In particular, the machine learning model may include a convolutional neural network. The machine learning model can process the trajectory data using convolutional neural network layers defined by multi-dimensional (e.g., two- or three-dimensional) convolutional filters, thereby enabling the machine learning model to learn complex spatial relationships between different spatial regions of the environment.

FIG. 5 is an illustration of an example process by which a data representation system can generate a time channel 502, a velocity channel 504, and a heading channel 506, which represent a trajectory of an agent in the environment up to and including the current time point.

The data which defines the previous trajectory of the agent is represented in a tabular format 508. Each row of the table defines a time point, a location the agent occupies in the environment at the time point, a velocity of the agent at the time point, and a heading of the agent at the time point.

For example, the first row of the table 508 defines that at time point −3 (e.g., 3 seconds before the current time point), the location occupied by the agent in the environment is defined by the coordinates [−3,−2] in the channel frame of reference, the velocity of the agent is 45 mph, and the agent of the vehicle is 45 degrees (e.g., clockwise from North). The coordinates [−3,−2] are expressed in the channel frame of reference and can be mapped to express a location in an environment frame of reference. For example, the coordinates in the channel frame of reference may represent 5 foot increments in a North-South-East-West environment frame of reference which is centered on a vehicle in the environment, e.g., a vehicle on-board which the representation is being generated. In this example, the coordinates [−3,−2] in the channel frame of reference may represent a location in the environment which is 15 feet West and 10 feet South of the location occupied by the agent at the current time point. As another example, the last row of the table 308 defines that at time point 0 (e.g., the current time point), the location the agent occupies is defined by the coordinates [0,0] in the channel frame of reference, the velocity of the agent is 49 mph, and the heading of the agent is 90 degrees.

The data representation system sets the data values in the time channel corresponding to locations [−3,−2], [−2,−1], [−1,0], and [0,0] to the respective time points −3, −2, −1, and 0 at which the agent occupies the respective locations. For clarity, the data values in the time channel corresponding to the other locations are shown as blank. Generally, the data representation system sets the data values in the time channel corresponding to the other locations to a default value (e.g., the value 0 or the value −1). Similarly, the data representation system sets the data values in the velocity channel corresponding to locations [−3,−2], [−2,−1], [4,0], and [0,0] to the respective velocity values 45, 47, 51, and 49 which define the velocity (in mph) of the agent when the agent occupies the respective locations. Similarly, the data representation system sets the data values in the heading channel corresponding to locations [−3,−2], [−2,−1], [−1,0], and [0,0] to the respective heading values 45, 45, 90, and 90 which define the heading (in degrees) of the agent when the agent occupies the respective locations.

In some implementations, the data representation system determines the channel frame of reference to cause the location occupied by the vehicle at the current time point to correspond to the data value in the "center" of each of the channels. Generating trajectory data with a consistent channel frame of reference can facilitate training of the machine learning model on the trajectory data.

Figure 6:
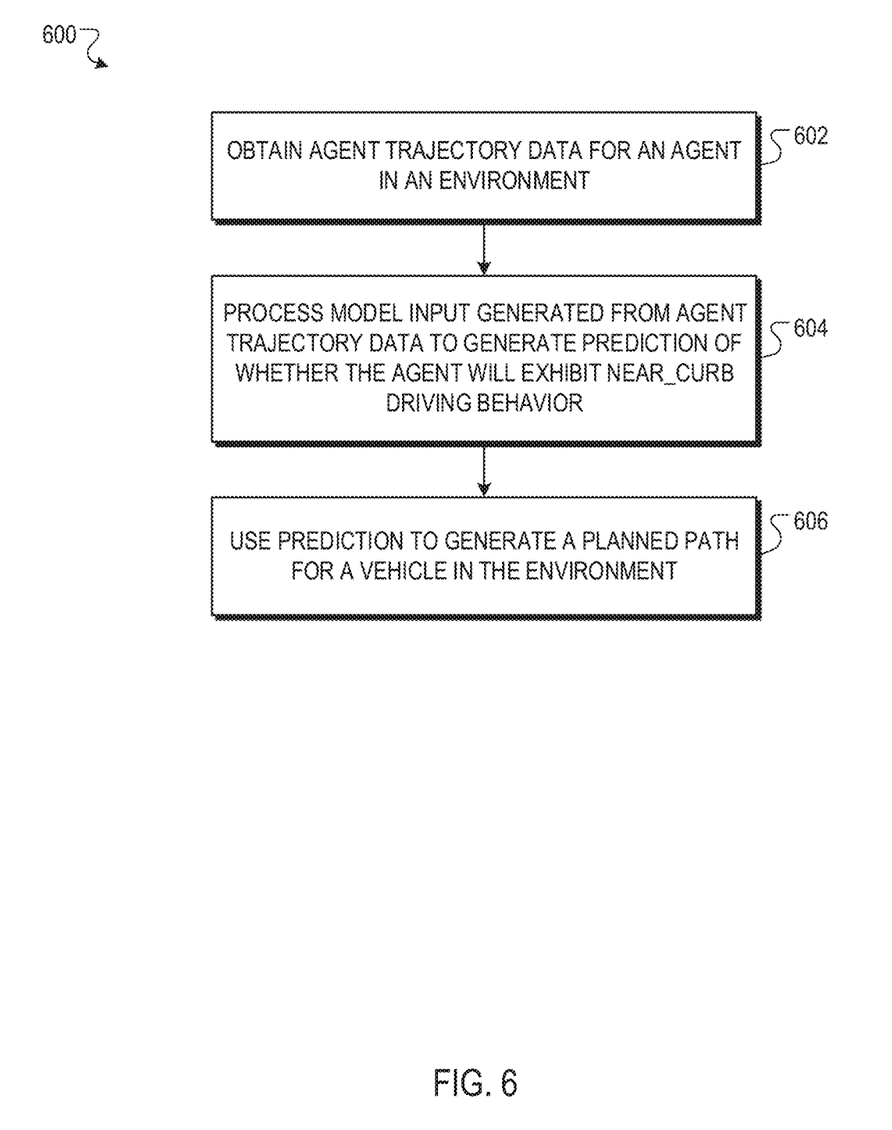
FIG. 6 is a flow diagram of an example process for predicting whether an agent will exhibit near-curb driving behavior.

FIG. 6 is a flow diagram of an example process 600 for predicting whether an agent will exhibit near-curb driving behavior. For convenience, the process 600 will be described as being performed by a system of one or more computers located in one or more locations. For example, an on-board system, e.g., the on-board system 110 depicted in FIG. 1, appropriately programmed in accordance with this specification, can perform the process 600.

The system obtains agent trajectory data for an agent in an environment (step 602). The agent trajectory data includes a current location of the agent and current values for a predetermined set of motion parameters of the agent. For example, the agent trajectory data can be in the format described above with reference to FIG. 4 and FIG. 5.

The system processes a model input generated from the agent trajectory data using a trained machine learning model to generate a model output that includes a prediction of whether the agent will exhibit near-curb driving behavior within a predetermined timeframe (step 604).

In some implementations, the model input includes one or more of: an image characterizing road lanes in the environment; or an image characterizing bounding boxes of one or more agents in the environment.

Processing the model input can include i) processing the model input using a first trained machine learning model to generate a score that characterizes a predicted likelihood that the agent will exhibit near-curb driving behavior within the predetermined timeframe; and ii) determining whether the score satisfies a predetermined threshold. For example, the first trained machine learning model can be a gradient-boosted decision tree. In some implementations, the system can then process a second model input generated from the agent trajectory data using a second trained machine learning model to generate a predicted distance or range of distances from the edge of the road in the environment that the agent will maintain during the predetermined timeframe.

The system uses the prediction to generate a planned path for a vehicle in the environment (step 606).

In some implementations, the system can generate the model input using agent trajectory data corresponding to multiple agents in the environment, and the model output can include, for each of the multiple agents in the environment, a respective prediction of whether the agent will exhibit near-curb driving behavior within the predetermined timeframe. For example, the model output can include a two-dimensional array of data values, where each position in the array corresponds to a respective location in the environment, and where the respective data value for each location that is a current location of one of the multiple agents characterizes the prediction of whether the agent will exhibit near-curb driving behavior within the predetermined timeframe.

In some implementations, the model output includes, for each of a plurality of different timeframes, a prediction of whether the agent will exhibit near-curb driving behavior within the timeframe.

Figure 7:
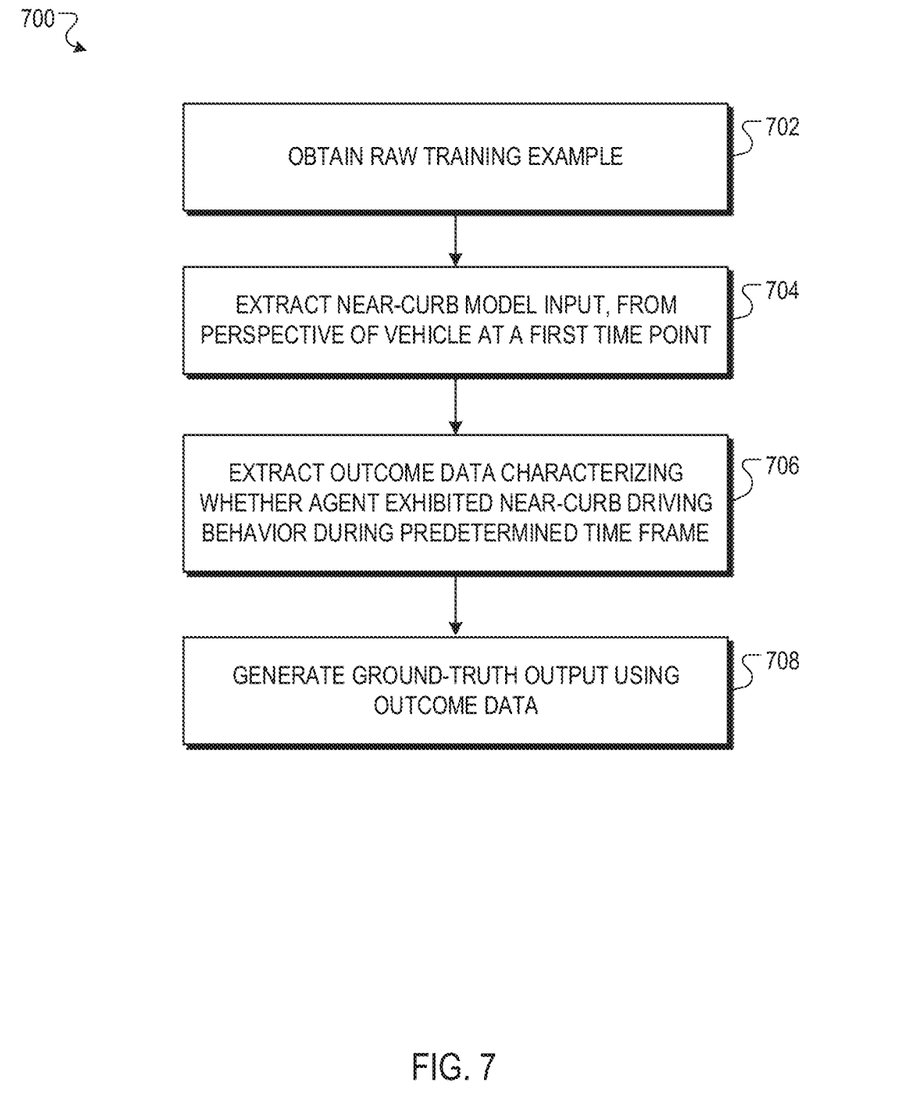
FIG. 7 is a flow diagram of an example process for generating a training example for training a machine learning model to predict near-curb driving behavior.

FIG. 7 is a flow diagram of an example process for generating a training example for training a machine learning model to predict whether one or more agents will exhibit near-curb driving behavior during a predetermined time frame. For convenience, the process 700 will be described as being performed by a system of one or more computers located in one or more locations. For example, a training system, e.g., the training system 120 depicted in FIG. 1, appropriately programmed in accordance with this specification, can perform the process 700.

The system obtains a raw training example (step 702). The system can obtain the raw training example from a vehicle navigating in the real world. As described above with reference to FIG. 1, the raw training example includes a near-curb model input (i.e., the input to the machine learning model) and outcome data.

The system extracts the near-curb model input from the raw training example (step 704). The near-curb model input can be used as a training input for the machine learning model.

The near-curb model input is from the point of view of the vehicle at a first time, and characterizes, for each represented agent in the environment, a current state at the first time point and, optionally, one or more previous states at respective previous time points before the first time point. As described above, the state of an agent at a given time point can include the location of the agent at the given time point, as well as values for a predetermined set of motion parameters. In some implementations, the vehicle trajectory data includes the time and motion channels described in reference to FIG. 4 and FIG. 5.

In some implementations, the system only receives raw sensor data (e.g., the raw sensor data 142 depicted in FIG. 1) instead of the near-curb model input. For example, the machine learning model may not be deployed on the vehicle from which the system receives the raw training example, and thus the vehicle does not generate the near-curb model input to the machine learning model. In these implementations, the system can generate the near-curb model input as described above with reference to the data representation system 150 depicted in FIG. 1.

The system extracts the outcome data from the raw training example (step 706). The outcome data characterizes whether one or more of the agents represented by the near-curb model input actually did exhibit near-curb driving behavior during the predetermined time frame. For example, if the first time point is time t and the predetermined time frame is from time t to time t+3, then the outcome data characterizes, for each agent, whether the agent satisfied the criteria for near-curb driving behavior between time t and time t+3.

The system generates a ground-truth output using the output data (step 708). The ground-truth output has the same format as the output of the machine learning model.

For example, in implementations in which the output of the machine learning model includes a score characterizing the predicted likelihood that an agent will exhibit near-curb driving behavior, the system can determine the ground-truth to be a '0' if the agent did not exhibit near-curb driving behavior during the predetermined time frame, and '1' if the agent did exhibit near-curb driving behavior during the predetermined time frame.

As another example, in implementations in which the output of the machine learning model is a two-dimensional array of elements each corresponding to a respective location in the environment, as described above with reference to FIG. 3, the system can generate an ground-truth output array. In particular, for the elements corresponding to locations of agents that did exhibit near-curb driving behavior, the system can determine the ground-truth value to be 1. In some implementations, for the elements corresponding to locations of agents that did not exhibit near-curb driving behavior, the system can determine the ground-truth value to be a small non-zero value, e.g., 0.05 or 0.01. This is done so that the ground-truth output encodes the fact that there is an agent in the corresponding location, and the fact that the agent did not exhibit near-curb driving behavior. This helps the machine learning model learn the format that the array should take, i.e., non-zero values for positions corresponding to locations of agents, and provides a richer error signal for updating the parameters of the model. In some other implementations, for the positions corresponding to locations of agents that did not exhibit near-curb driving behavior, the system determines the ground-truth value to be 0. For the positions corresponding to locations not occupied by an agent, the system can determine the ground-truth value to be a default value, e.g., 0.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
obtaining agent trajectory data for an agent in an environment, the agent trajectory data comprising a current location and current values for a predetermined set of motion parameters of the agent;
processing a model input generated from the agent trajectory data using a trained machine learning model to generate a model output comprising a prediction of whether the agent will exhibit near-curb driving behavior within a predetermined timeframe, wherein an agent exhibits near-curb driving behavior when the agent operates within a particular distance of an edge of a road in the environment; and
using the prediction to generate a planned path for a vehicle in the environment.

Embodiment 2 is the method of embodiment 1, wherein processing the model input using a trained machine learning model comprises:
processing the model input using a first trained machine learning model to generate a score that characterizes a predicted likelihood that the agent will exhibit near-curb driving behavior within the predetermined timeframe; and
determining whether the score satisfies a predetermined threshold.

Embodiment 3 is the method of embodiment 2, further comprising:
in response to determining that the score satisfies a predetermined threshold, processing a second model input generated from the agent trajectory data using a second trained machine learning model to generate a predicted distance or range of distances from the edge of the road in the environment that the agent will maintain during the predetermined timeframe.

Embodiment 4 is the method of any one of embodiments 2 or 3, wherein the first trained machine learning model is a gradient-boosted decision tree.

Embodiment 5 is the method of any one of embodiments 1-4, wherein an agent exhibits near-curb driving behavior if a center of the agent is closer to the edge of the road than to a center of the road.

Embodiment 6 is the method of any one of embodiments 1-5, wherein:
the model input has been generated using agent trajectory data corresponding to a plurality of second agents in the environment;
the model output comprises, for each of the plurality of second agents in the environment, a respective prediction of whether the second agent will exhibit near-curb driving behavior within the predetermined timeframe.

Embodiment 7 is the method of embodiment 6, wherein the model output comprises a two-dimensional array of data values, wherein each position in the array corresponds to a respective location in the environment, and wherein the respective data value for each location that is a current location of one of the plurality of second agents characterizes the prediction of whether the second agent will exhibit near-curb driving behavior within the predetermined timeframe.

Embodiment 8 is the method of any one of embodiments 1-7, wherein the model output comprises, for each of a plurality of different timeframes, a prediction of whether the agent will exhibit near-curb driving behavior within the timeframe.

Embodiment 9 is the method of any one of embodiments 1-8, wherein the model input comprises at least one of:
an image characterizing road lanes in the environment; or
an image characterizing a bounding box of the agent.

Embodiment 10 is the method of any one of embodiments 1-9, wherein the trained machine learning model is configured to generate predictions for agents of a particular type or a set of particular types, wherein the particular type or set of particular types comprises:
a vehicle type;
a cyclist type; or
a pedestrian type.

Embodiment 11 is a system comprising one or more computers and one or more storage devices storing instructions that when executed by the one or more computers cause the one or more computers to perform operations comprising the method of any one of embodiments 1-10.

Embodiment 12 is one or more non-transitory computer storage media storing instructions that when executed by one or more computers cause the one more computers to perform operations comprising the method of any one of embodiments 1-10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining agent trajectory data for a first vehicle in an environment, the agent trajectory data comprising a current location and current values for a predetermined set of motion parameters of the agent;
   generating, based on the agent trajectory data, a prediction of whether the first vehicle will exhibit near-curb driving behavior within a predetermined timeframe while driving along a road, wherein the first vehicle exhibits near-curb driving behavior while driving along the road when a center of the first vehicle is closer to an edge of the road than to a center of the road while driving along the road for the predetermined timeframe, and wherein the prediction comprises a predicted likelihood that the first vehicle will exhibit near-curb driving behavior during the predetermined timeframe;
   using the prediction to generate a planned path for a second vehicle in the environment; and
   controlling the second vehicle based on the planned path.

2. The method of claim 1, wherein generating, based on the agent trajectory data, the prediction of whether the first vehicle will exhibit near-curb driving behavior comprises:
   processing a model input using a first trained machine learning model to generate a model output comprising the predicted likelihood that the first vehicle will exhibit near-curb driving behavior within the predetermined timeframe; and
   determining whether the predicted likelihood satisfies a predetermined threshold.

3. The method of claim 2, further comprising:
   in response to determining that the predicted likelihood satisfies a predetermined threshold, processing a second model input generated from the agent trajectory data using a second trained machine learning model to generate a predicted distance or range of distances from the edge of the road in the environment that the first vehicle will maintain during the predetermined timeframe.

4. The method of claim 2, wherein the first trained machine learning model is a gradient-boosted decision tree.

5. The method of claim 2, wherein:
   the model input has been generated using agent trajectory data corresponding to a plurality of agents in the environment, wherein the plurality of agents includes the first vehicle; and
   the model output comprises, for each of the plurality of agents in the environment, a respective prediction of whether the agent will exhibit near-curb driving behavior within the predetermined timeframe.

6. The method of claim 5, wherein the model output comprises a two-dimensional array of data values, wherein each position in the array corresponds to a respective location in the environment, and wherein the respective data value for each location that is a current location of one of the plurality of agents characterizes the prediction of whether the agent will exhibit near-curb driving behavior within the predetermined timeframe.

7. The method of claim 5, wherein the first trained machine learning model is configured to generate predictions for agents of a particular type or a set of particular types, wherein the particular type or set of particular types comprises:
   a vehicle type;
   a cyclist type; or
   a pedestrian type.

8. The method of claim 2, wherein the model output comprises, for each of a plurality of different timeframes, a prediction of whether the first vehicle will exhibit near-curb driving behavior within the timeframe.

9. The method of claim 2, wherein the model input comprises at least one of:
   an image characterizing road lanes in the environment; or
   an image characterizing a bounding box of the vehicle.

10. The method of claim 1, wherein a distance from the center of the first vehicle and the edge of the road is a particular distance with respect to a width of the road, wherein the center of the first vehicle being closer to the edge of the road than to the center of the road is defined by the particular distance being less than half of the width of the road.

11. The method of claim 1, wherein the first vehicle exhibits near-curb driving behavior when the first vehicle operates off the road but still within a particular distance of an edge of the road.

12. A system comprising one or more computers and one or more storage devices storing instructions that are operable, when executed by the one or more computers, to cause the one or more computers to perform operations comprising:
   obtaining agent trajectory data for a first vehicle in an environment, the agent trajectory data comprising a current location and current values for a predetermined set of motion parameters of the agent;
   generating, based on the agent trajectory data, a prediction of whether the first vehicle will exhibit near-curb driving behavior within a predetermined timeframe while driving along a road, wherein the first vehicle exhibits near-curb driving behavior while driving along the road when a center of the first vehicle is closer to an edge of the road than to a center of the road while driving along the road for the predetermined timeframe, and wherein the prediction comprises a predicted likelihood that the first vehicle will exhibit near-curb driving behavior during the predetermined timeframe;
   using the prediction to generate a planned path for a second vehicle in the environment; and
   controlling the second vehicle based on the planned path.

13. The system of claim 12, wherein generating, based on the agent trajectory data, the prediction of whether the first vehicle will exhibit near-curb driving behavior comprises:
  processing a model input using a first trained machine learning model to generate a model output comprising the predicted likelihood that the agent will exhibit near-curb driving behavior within the predetermined timeframe; and
  determining whether the predicted likelihood satisfies a predetermined threshold.

14. The system of claim 13, the operations further comprising:
  in response to determining that the predicted likelihood satisfies a predetermined threshold, processing a second model input generated from the agent trajectory data using a second trained machine learning model to generate a predicted distance or range of distances from the edge of the road in the environment that the first vehicle will maintain during the predetermined timeframe.

15. The system of claim 13, wherein:
  the model input has been generated using agent trajectory data corresponding to a plurality of agents in the environment, wherein the plurality of agents includes the first vehicle; and
  the model output comprises, for each of the plurality of agents in the environment, a respective prediction of whether the agent will exhibit near-curb driving behavior within the predetermined timeframe.

16. The system of claim 12, wherein the model output comprises, for each of a plurality of different timeframes, a prediction of whether the first vehicle will exhibit near-curb driving behavior within the timeframe.

17. One or more non-transitory computer-readable storage media storing instructions that when executed by one or more computers cause the one or more computers to perform operations comprising:
  obtaining agent trajectory data for a first vehicle in an environment, the agent trajectory data comprising a current location and current values for a predetermined set of motion parameters of the agent;
  generating based on the agent trajectory data, a prediction of whether the first vehicle will exhibit near-curb driving behavior within a predetermined timeframe while driving along a road, wherein the first vehicle exhibits near-curb driving behavior while driving along the road when a center of the first vehicle is closer to an edge of the road than to a center of the road while driving along the road for the predetermined timeframe, and wherein the prediction comprises a predicted likelihood that the first vehicle will exhibit near-curb driving behavior during the predetermined timeframe;
  using the prediction to generate a planned path for a second vehicle in the environment; and
  controlling the second vehicle based on the planned path.

18. The non-transitory computer-readable storage media of claim 17, wherein generating, based on the agent trajectory data, the prediction of whether the first vehicle will exhibit near-curb driving behavior comprises:
  processing a model input using a first trained machine learning model to generate a model output comprising the predicted likelihood that the first vehicle will exhibit near-curb driving behavior within the predetermined timeframe; and
  determining whether the predicted likelihood satisfies a predetermined threshold.

19. The non-transitory computer-readable storage media of claim 18, the operations further comprising:
  in response to determining that the predicted likelihood satisfies a predetermined threshold, processing a second model input generated from the agent trajectory data using a second trained machine learning model to generate a predicted distance or range of distances from the edge of the road in the environment that the first vehicle will maintain during the predetermined timeframe.

20. The non-transitory computer-readable storage media of claim 18, wherein:
  the model input has been generated using agent trajectory data corresponding to a plurality of agents in the environment, wherein the plurality of agents includes the first vehicle;
  and the model output comprises, for each of the plurality of agents in the environment, a respective prediction of whether the agent will exhibit near-curb driving behavior within the predetermined timeframe.

21. The non-transitory computer-readable storage media of claim 18, wherein the model output comprises, for each of a plurality of different timeframes, a prediction of whether the first vehicle will exhibit near-curb driving behavior within the timeframe.

* * * * *